United States Patent [19]

Sigalas et al.

[11] Patent Number: 5,690,706

[45] Date of Patent: Nov. 25, 1997

[54] ABRASIVE BODY

[76] Inventors: Iakovos Sigalas, 112 3rd Street, Linden, Johannesburg; Martin Kramer, 80 Davidson Street, Fairland, Johannesburg; Johan Myburgh, 13 Shelley Drive, Kloofendal Ext. 3, Florida; Serdar Ozbayraktar, 12 Frequency Turn, Radiokop Ext. 10, Roodepoort; Siu-Wah Wai, 22 Buffalo Street, Albertsdal, Alberton, all of South Africa

[21] Appl. No.: 567,263

[22] Filed: Dec. 5, 1995

[30] Foreign Application Priority Data

Dec. 6, 1994 [ZA] South Africa ............................ 94/9699

[51] Int. Cl.$^6$ .................................................................. B24D 3/24
[52] U.S. Cl. ............................ 51/307; 51/309; 407/119; 501/32
[58] Field of Search ............................ 51/293, 307–309; 407/119; 501/32

[56] References Cited

U.S. PATENT DOCUMENTS

| | | | |
|---|---|---|---|
| 3,136,615 | 6/1964 | Bovenkirk et al. | 51/307 |
| 3,233,988 | 2/1966 | Wentorf et al. | 51/307 |
| 3,743,489 | 7/1973 | Wentorf, Jr. et al. | 51/307 |
| 3,745,623 | 7/1973 | Wentorf, Jr. et al. | 407/119 |
| 3,767,371 | 10/1973 | Wentorf, Jr. et al. | 51/307 |
| 4,311,490 | 1/1982 | Bovenkirk et al. | 51/307 |
| 4,647,546 | 3/1987 | Hall, Jr. et al. | 51/307 |
| 5,010,043 | 4/1991 | Ringwood | 51/307 |
| 5,123,935 | 6/1992 | Kanamaru et al. | 51/309 |
| 5,418,197 | 5/1995 | Brandt | 51/307 |
| 5,420,083 | 5/1995 | Brandt | 51/307 |

FOREIGN PATENT DOCUMENTS

| | | | |
|---|---|---|---|
| 0 491 184 | 11/1991 | European Pat. Off. | C04B 35/10 |
| 0 571 865 | 5/1993 | European Pat. Off. | C04B 35/10 |
| 55-042737 | 3/1980 | Japan | C04B 35/58 |
| 04202058 | 7/1992 | Japan | B24D 3/14 |

OTHER PUBLICATIONS

Rabe, et al., "Development of Dense Nanocrystalline Titanium Nitride", Ceramic Processing Science and Technology, pp. 793–797 (1994).

Sagel–Ransijn et al, "Synthesis and Characterization of Nanocrystalline Y–TZP", Ceramic Processing Science and Technology, pp. 33–37 (1994).

Nab, et al., "Colloidal Processing and Sintering of Nano–Scale TiN", Ceramic Processing Science and Technology, pp. 591–595 (1994).

Skandan, et al., "Ultrafine–Grained Dense Monoclinic and Tetragonal Zirconia", J. Am. Ceram., Soc., vol. 77 (1994), pp. 1706–1710.

*Primary Examiner*—Deborah Jones
*Attorney, Agent, or Firm*—Scully, Scott, Murphy and Presser

[57] ABSTRACT

The invention provides a method of manufacturing an abrasive body which includes the steps of providing a mixture comprising a mass of nanosized ceramic particles and a mass of ultra-hard abrasive particles, typically diamond and cubic boron nitride, and sintering the mixture into a coherent body. The sintering conditions used are hot-pressing conditions.

6 Claims, No Drawings

ABRASIVE BODY

BACKGROUND OF THE INVENTION

This invention relates to abrasive bodies for use as wear parts, cutting tool inserts and the like.

Abrasive compacts are used extensively in curing, milling, grinding, drilling and other abrasive operations. They generally contain ultra-hard abrasive particles dispersed in a second phase matrix. The matrix may be metallic or ceramic. The ultra-hard abrasive particles may be diamond or cubic boron nitride and are present in a high amount, i.e. 70 percent by volume or higher. These particles are known to bond to each other during the high pressure and high temperature compact manufacturing process forming a polycrystalline mass. The bodies so produced are thus also known as PCD or PCBN.

Examples of diamond and cubic boron nitride abrasive compacts are described in U.S. Pat. Nos. 3,745,623, 3,767,371 and 3,743,489.

Refractory ceramics have been synthesized at relatively low temperatures and ambient pressures by sintering nanosized powder based compacts. Sintered ceramic bodies of various shapes may be produced by utilizing this route. The following papers describe such processes:

1. Rudiger NaB, Sener Albayrak, Mesut Asian and Helmut Schmidt "Colloidal Processing and Sintering of Nanoscale TiN" International Conference, Ceramic Processing Science and Technology, Friedrichshaven, Germany September 1994.
2. T. Rabe and R. Wäsche "Development of Dense Nanocrystalline Titanium Nitride" International Conference, Ceramic Processing Science and Technology. Friedrichshaven, Germany September 1994.
3. C. D. Sagel-Ransijn, A. J. A. Winnubst, A. J. Burgraaf and H. Verweij "The Synthesis and Characterisation of Nanoscale Y-TZP" Friedrichshaven, Germany September 1994.
4. G. Skandan, H. Hahn, Mike Roddy and R. Cannon "Ultrafine-Grained Dense Monoclinic and Tetragonal Zirconia" J. Amer. Cer. Soc. 77 1706 (94).

Diamond grinding wheels comprising a mass of diamond particles dispersed in a ceramic matrix are also known in the art.

SUMMARY OF THE INVENTION

According to the present invention, a method of manufacturing an abrasive body includes the steps of:

providing a mixture comprising a mass of nanosized ceramic particles and a mass of ultra-hard abrasive particles; and sintering of the mixture into a coherent body.

DESCRIPTION OF EMBODIMENTS

The mixture of ceramic particles and ultra-hard abrasive particles is preferably a homogeneous mixture. This mixture may be formed by forming a slurry of the nanosized ceramic particles and then adding the abrasive particles thereto. Alternatively, slurries of both the nanosized ceramic particles and the ultra-hard abrasive particles may be made and the slurries then mixed. In both cases the liquid medium will be driven off or otherwise removed to leave a mixture of the particles.

The nanosized particles will typically be deagglomerated by means of milling, ultrasonic agitation or the like, prior to use.

The ultra-hard abrasive particles are preferably diamond or cubic boron nitride (CBN). These particles will generally be of micron size, although they can also be of nanosize. When the particles are of nanosize they will also generally be deagglomerated, prior to use.

When reference is made to a particle size in this specification and the claims that is a reference to mean particle size.

The ceramic particles will generally and preferably dominate in the mixture. Typically, the ultra-hard abrasive particles will not exceed 35 percent by volume of the mixture and will be present in an amount of at least 10 percent by volume of the mixture. In the case of diamonds, the particles will generally not exceed 25 percent by volume of the mixture. In the case of CBN, the particles will generally not exceed 30 percent by volume of the mixture.

Sintering of the mixture into a coherent body will typically take place at a temperature of 800° C. to 1500° C., preferably 900° C. to 1400° C., and at a pressure of up to 300 MPa. The conditions are thus of a hot-pressing nature and are not such as are needed to produce an abrasive compact where conditions at which the ultra-hard abrasive particle is crystallographically stable are used. Adjacent ultra-hard abrasive particles are generally not bonded to each other, but are discrete and strongly bonded to the surrounding second phase material, which forms a continuous phase.

The ceramic particles are preferably refractory ceramic particles. Examples of suitable ceramics are carbides, nitrides, borides and oxides of various metals, particularly transition metals, silicon or aluminum. Examples of suitable ceramic particles are silicon carbide, silicon nitride, tungsten carbide, titanium carbide, titanium nitride, titanium carbonitride, aluminum oxide, and the like.

The sintered abrasive body manufactured by the method of the invention comprises the ultra-hard abrasive particle dispersed, and generally uniformly dispersed, in a second phase material which is a ceramic and constituted by the sintered ceramic particles. The high activity of the nanosized ceramic particles enables sintering to be achieved at a lower temperature than is required when coarser particles are used. Further, it has been found that the abrasive bodies can accommodate relatively high contents of diamond and CBN and yet achieve a low porosity which is important for creating toughness and strength in the sintered body. Further, it has surprisingly been found that the nanosized ceramic particles ensure that there is a lesser amount of degradation of the ultra-hard abrasive particles, e.g. graphitization of diamond and conversion of CBN to HBN, than is achievable with larger ceramic particles. This has the important consequence that the strength and wear-resistance of the sintered body is improved.

The sintered abrasive bodies produced are tough and wear-resistant and are suitable for use, for example, as wear-resistant surfaces such as bearing surfaces or as tool inserts. Where the ultra-hard abrasive particle is cubic boron nitride, the body can be used for cutting or machining alloys or ferrous nickel base alloys or nickel based superalloys. Where the ultra-hard abrasive particle is diamond, the body may be used in various cutting, machining and drilling applications in engineering and mining. For example, it may be used as the abrasion resistant, active cutting element in woodworking applications, or in the machining of aluminum silicon alloys, or in the machining of fibre reinforced polymer or metal matrix composites. Also, the abrasive bodies may be used as the cutting or gauge keeping element in coring or oil drilling bits.

The invention is illustrated by the following examples.

EXAMPLE 1

Alumina powder having a particle size of 10 to 20 nanometers and diamond having a particle size of less than 2 microns were both deagglomerated by means of milling. The deagglomerated particles were each mixed with water producing two slurries. Dopants known in the art for promoting sintering may be added to each or either slurry.

The slurries were then mixed by means of ball milling. The mixed slurries were spray dried producing a homogeneous powder mixture. The particle size of the mixed powder was less than 100 microns. These particles may, if desired, be crushed to a smaller particle size.

The powder mixture was cold-pressed at a pressure of IGPa. The cold-pressed mixture was then sintered at a temperature which was raised from zero to about 1200° C. at a rate of approximately 20° C. per minute and held at this higher temperature and at a pressure of approximately 200 MPa for a period of about 30 minutes.

The sintered body was found to contain 20 percent by volume of diamond and had a porosity of about 3 percent. The product was crack free and the discrete diamond particles were uniformly distributed through the ceramic matter. No graphitization of the diamond was detectable by X-ray diffraction analysis.

EXAMPLE 2

A sintered body of CBN in an alumina sintered ceramic second phase was produced following the method of Example 1, save that the powdered mixture was freeze dried into granules. The granules were then sintered in the same manner as set out in Example 1, except that the sintering temperature used was 1380° C. The sintered product was found to contain 30 percent by volume of CBN and had a porosity of less than 3 percent. The product was crack free and the discrete CBN particles were uniformly distributed through the ceramic matrix.

EXAMPLE 3

Deagglomerated nanosized alumina powder (mean particle size 50 nm) was mixed with fine diamond powder (mean particle size 1 nm) by ball milling in methanol. The milling medium was alumina balls. The resulting powder mixture contained 30 volume percent of diamond particles. The mixture was further dried at 60° C. in an oven.

The dried mass was crushed into fine granules, i.e. less than 50 microns, and filled into a graphite mold to produce a final sample of 18 mm diameter and 5 mm thickness. Hot pressing of the granules was carried out in inert atmosphere at 1150° C., and 30 MPa pressure and maintained for 30 minutes.

The sintered product was crack free, and the measured density was found to have about 1 percent porosity. The discrete diamond particles were uniformly distributed in an alumina matrix.

EXAMPLE 4

Nanosized TiN (mean particle size 40 nm) was ultrasonically dispersed in water-free toluene containing 7 weight percent oleic acid as a dispersing agent. Fine CBN powder was added (mean particle size 2 μm) resulting in a TiN:CBN ratio of 2:1 by volume. For further mixing, the suspension was milled using the method described in Example 3, with toluene as solvent and dried TiN balls as milling medium. The powder mixture was dried at 60° C. using an evaporator.

The powder processing procedure was carried out in an inert atmosphere. The organic component was removed by suitable heat treatment in inert atmosphere.

The resulting mass was cold pressed to produce a coherent green-state body. The green state body was sintered at a temperature of about 1380° C. and a pressure of 200 MPa. These conditions were maintained for 30 minutes. A dense sintered product was achieved with a porosity of less than 3 percent. No graphitization was detected by X-ray diffraction analysis.

EXAMPLE 5

Deagglomerated nanosized $ZrO_2$–3 weight percent $Y_2O_3$ (mean particle size 50 nm) was processed into a mixture containing 25 percent by volume diamond (mean particle size of diamond: 1 μm) using the method described in Example 2. The resulting powder mixture was hot pressed at 1200° C., at 200 MPa in an inert atmosphere maintained for 30 minutes. A dense sintered product was obtained with a 3 percent porosity. No graphitization was detectable by X-ray diffraction analysis.

We claim:

1. A method of manufacturing an abrasive body comprising the steps of:

providing a mixture comprising a mass of nanosized ceramic particles and a mass of ultra-hard abrasive particles comprised of diamond or cubic boron nitride particles, wherein the ultra-hard abrasive particles in the mixture do not exceed 35 percent by volume of the mixture; and sintering of the mixture into a coherent body at a temperature of 800° C. to 1500° C. and a pressure of up to 300 MPa.

2. A method according to claim 1 wherein the ultra-hard abrasive particles are of micron size.

3. A method according to claim 1 wherein the ceramic particles are selected from carbides, nitrides, borides and oxides.

4. A method according to claim 3 wherein the carbides, nitrides, borides and oxides are of a transition metal, silicon or aluminum.

5. A method according to claim 1 wherein the ceramic particles are selected from silicon carbide, silicon nitride, tungsten carbide, titanium carbide, titanium nitride, titanium carbonitride and aluminum oxide.

6. A method according to claim 1 wherein the mixture of ceramic particles and ultra-hard abrasive particles is a homogeneous mixture.

* * * * *